3,217,622
OPHTHALMOSCOPIC CAMERA
Yutaka Kiyono, Suginami-ku, Tokyo-to, Japan, assignor to Mamiya Koki Kabushiki Kaisha, Tokyo-to, Japan, a joint-stock company of Japan
Filed Mar. 30, 1962, Ser. No. 183,976
Claims priority, application Japan, Oct. 10, 1961, 36/36,184
2 Claims. (Cl. 95—11)

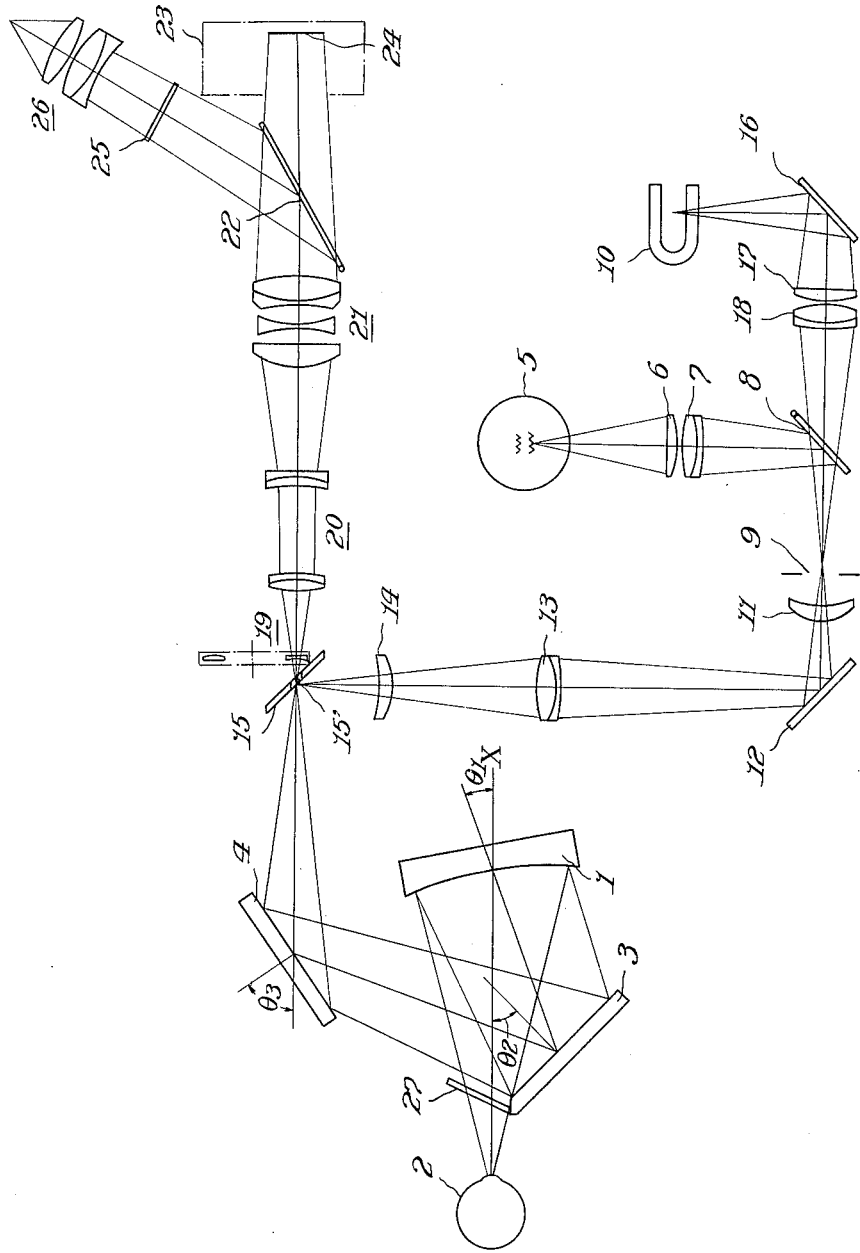

This invention relates to an ophthalmoscopic (fundus or retina viewing) camera apparatus incorporating a simplified optical system whereby extraneous reflected light is prevented from entering the photographic optical path.

In ophthalmoscopic cameras it is normal practice to illuminate the retinal area under observation for photography by light emanating from a source of illumination. This illuminating light tends to be reflected by objects other than the retina, consituting the inner wall of the eye confronting the lens, and this reflected light tends to interfere with the light coming from the photographic subject, namely the retinal area. Much ingenuity has been directed toward elimination of the detrimental light rays in order to improve the quality of the photographic reproduction of the retinal wall.

It is an object of the present invention to provide a new ophthalmoscopic camera apparatus in which the above-mentioned detrimental light rays are eliminated.

It is another object of the invention to provide an ophthalmoscopic camera apparatus as stated above which can be manufactured with relative ease.

The foregoing objects have been achieved by the present invention, in which the common optical path of the observational and photographic systems does not contain any lenses but is composed entirely of reflectors, of which at least one is a concave mirror positioned at an angle to prevent admixture of unwanted ambient light with the photographic rays, thus permitting photography of the retinal area with sharpness and fidelity. In addition, the arrangement affords ease of manufacture.

The nature of the invention, its details, and the manner in which the above-stated objects may best be achieved will be more clearly apparent by reference to the following description of one representative embodiment of the invention when taken in conjunction with the accompanying drawing which is a schematic diagram showing the arrangement of apparatus and the various optical paths thereof.

Throughout the following description, angles of juxtaposition of parts are angles between the normal axes of symmetry of the said parts and the corresponding optical path axes intersecting the said normal axes, and the directions "upward" and "downward," designating those as viewed in the drawing, are presented merely for convenience of description.

Referring to the drawing, reference numeral 1 designates a concave spherical mirror of 175 mm. radius curvature, which is fixed at an angle of $\theta_1$ deflection downward in relation to the antero-posterior axis of the eyeball 2 to be examined and photographed. In relation to this axis X are positioned a flat mirror 3 angled $\theta_2$ upward, and a flat mirror 4 angled $\theta_3$ downward, said angles $\theta_1$, $\theta_2$ and $\theta_3$ being, for example, respectively, 10°, 45° and 55°.

At a suitable position an incandescent light bulb 5 is provided as a source of light for observational purposes. The rays emanating from this lamp pass through a condenser 6 and a lens 7, and are deflected by a hinged mirror 8 toward an aperture 9 where convergence is arranged. The hinged mirror 8 rotates about its upper edge, and is adapted to swing upward. As will be described later, the hinged mirror 8 is made to swing upward, outside of the optical path of an electronic flash tube 10, such as a "strobotron," when this tube is actuated for photography.

The aperture 9 is either in the form of two semi-circular orifices disposed with their flat sides in parallel opposition, or in the form of an annular ring formed by a circular hole and a circular disk of smaller diameter suspended concentrically therein by wires so as to impart a ring form to the cross section of the light beam.

Following the aperture 9 in the optical path are a lens 11, a mirror 12 and lenses 13 and 14, arranged so that the light rays converge upon a mirror 15 which is provided at its center with an orifice 15' to provide a path for observing, focusing and photographing, as will be described hereinafter. The light rays emanating from the lamp 5 or electronic flash tube 10, after passing through the aperture 9, are made to converge upon mirror 15, avoiding the orifice 15', to be reflected toward mirrors 4 and 3, which in turn direct the light toward the concave mirror 1 for illumination of the interior of the eyeball 2.

The electronic flash tube 10 is used for the photographic light source. The light from this tube is reflected by a mirror 16 to pass through a condenser 17 and a lens 18 to converge at the aperture 9. Its subsequent course is identical to that of the light emanating from the observational light source 5.

To the rear of the mirror 15 and orifice 15' is a turret arrangement of correction lenses 19 permitting the positioning behind the orifice 15' of the suitable lens for the eyeball under examination. Next, along the optical path is a so-called "zoom" type focusing lens 20, followed by a camera lens group 21 and a hinged mirror 22, the hinge of which is located along its lower edge. The camera system is further provided with a film casing 23, a film gate 24, a viewing screen 25, and a viewing lens group 26. The film surface is disposed at an angle of 20' toward the rear. At the front end, or the part of the apparatus nearest the eyeball being photographed, is a front window 27 which is made of a clear glass and is set at an angle of 26° downward, and which serves as a dust seal.

During viewing and focusing, the hinged mirrors 8 and 22 are positioned in the optical path as shown in the diagram, while when photography is performed, these mirrors are swung out of the way by means of electromagnets actuated immediately before the emission of a flash by the electronic tube 10. Arranged to function in synchronization with the electronic flash tube is a shutter mechanism (not shown) positioned adjacent to the film gate 24.

By the arrangement based on this invention, lamp 5 provides the light for illuminating the interior of the eyeball 2 for viewing and focusing through lens 26, adjustments being effected by correction lenses 19 and the focusing lens 20 to obtain a sharp image on the viewing screen 25. When all is in readiness, the hinged mirrors 8 and 22 swing out of the optical path, and a flash is emitted by the electronic tube 10 to cause the image of the retinal area to be registered on the film at film gate 24, whereby photography is accomplished.

Although this invention has been described with respect to a particular embodiment thereof, it is not to be so limited as changes and modifications may be made therein which are within the full intended scope of the invention, as defined by the appended claims.

What is claimed is:

1. An ophthalmoscopic camera apparatus comprising: a first light source for observational purpose; a second light source for photographic purpose, both said light sources having optical paths which are joined confluently into a common optical path to the object eyeball to be photographed; a group of mirrors disposed in the end portion of said common optical path immediately before the object eyeball, and which contains at least one concave mirror for concentrating light on the retinal wall of the object eyeball, said concave mirror being so set at an angle to the optical path, in conjunction with said flat mirrors, that the interference of rays other than those reflected by the retinal area of the eye is prevented; a camera system which receives light reflected from the said retinal wall in reverse direction through the same said group of mirrors; optical means positioned at the intersection of the optical paths of the said light sources and the said camera system, and which directs illuminating light toward the object by way of the said group of mirrors and directs reflected light from the object toward the said camera system; and shutter means for exposing the film in said camera system, the said shutter means including synchronization means for switching the object illumination from the aforesaid first light source to the aforesaid second light source immediately prior to the exposure operation and including a viewing section disposed so as to receive light rays angularly disposed to the light rays entering said camera system, first swinging flat mirror means disposed so as to direct light when in one position into said viewing section and in a second position into said camera section, second swinging flat mirror means at said confluent junction disposed so as to direct light from the first and second source along said common path, said first and second swinging mirrors means being responsive to said synchronization means.

2. An ophthalmoscopic camera apparatus as claimed in claim 1, said optical means positioned at said intersection consisting of a mirror with an aperture therein.

References Cited by the Examiner
UNITED STATES PATENTS

| | | | |
|---|---|---|---|
| 815,859 | 3/1906 | Palis | 88—20 |
| 1,211,073 | 1/1917 | Bugbee | 88—20 |
| 2,586,973 | 2/1952 | McMillin | 95—11 |
| 2,902,911 | 9/1959 | Noyori | 95—11 |
| 3,036,568 | 5/1962 | Stark | 128—2 |

JOHN M. HORAN, *Primary Examiner.*

NORTON ANSHER, *Examiner.*